UNITED STATES PATENT OFFICE.

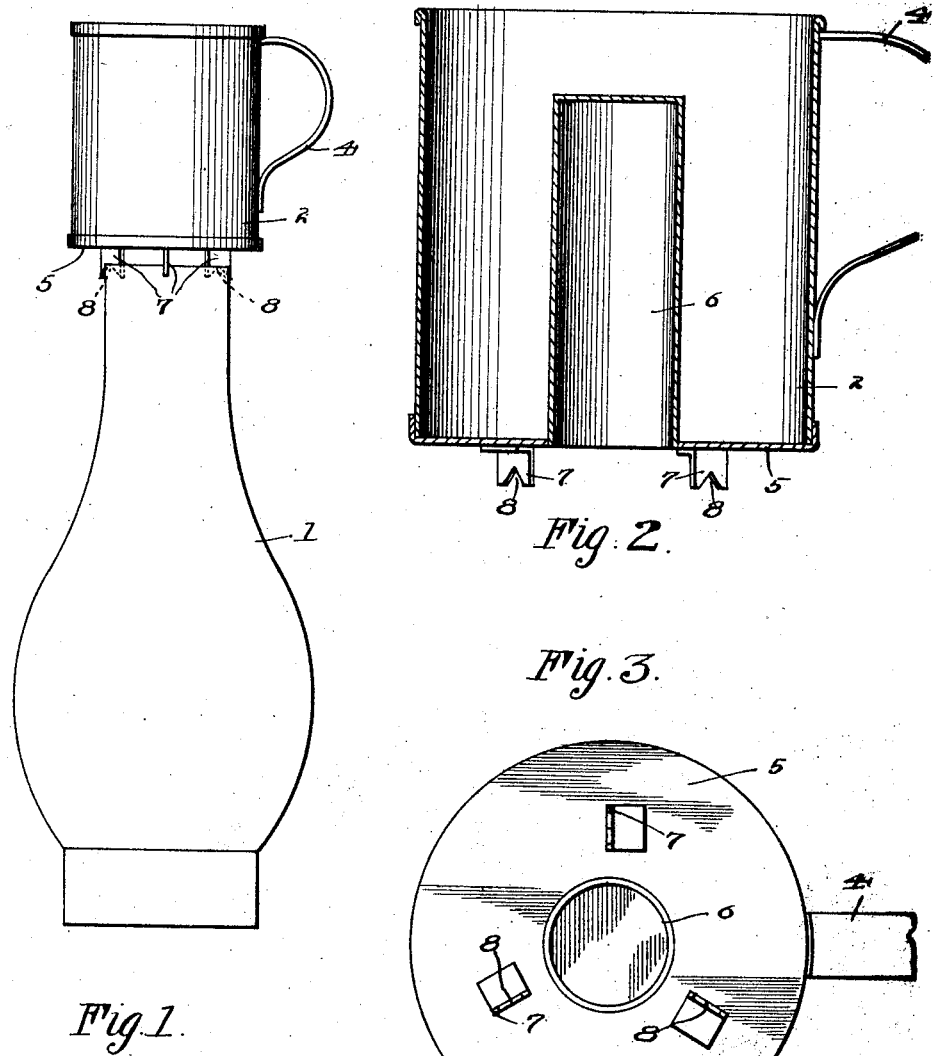

LEE H. WHITEHORN, OF EUREKA, COLORADO.

HEATER.

1,327,508.  Specification of Letters Patent.  Patented Jan. 6, 1920.

Application filed August 2, 1918. Serial No. 248,008.

*To all whom it may concern:*

Be it known that I, LEE H. WHITEHORN, a citizen of the United States, residing at Eureka, in the county of San Juan and State of Colorado, have invented new and useful Improvements in Heaters, of which the following is a specification.

This invention relates to heaters especially adapted for nursery or general household purposes, and has for its object to produce a simple, cheap and thoroughly effective device whereby comparatively a small quantity of water may be easily and quickly heated.

The improvement is primarily, but not necessarily, adapted to be applied to the chimney of a lamp, and thus employ the heat units, which would otherwise be wasted for heating water in a suitable receptacle that has arranged in the bottom thereof a tubular dome closed at its inner end and adapted to receive the major portion of the heat units whereby the contents of the device may be easily and quickly heated.

A further object of the invention is to produce a heater for water or other fluids, comprising a receptacle having a heat dome in the bottom thereof and provided with spaced legs whereby the bottom of the receptacle is elevated when applied to a heater, the said legs being notched to permit of the same being readily arranged upon the outer edge of a lamp chimney, when such device is employed for heating the contents of the receptacle, and the legs, as well as the notches therein permitting the free circulation of the heat units around the bottom of the device.

I accomplish the foregoing objects, and others which will appear as the nature of the invention is better understood, by a simple construction, combination and arrangement of parts such as set forth in the following description.

In the accompanying drawings:

Figure 1 is a view illustrating a heater, in accordance with this invention in applied position upon a lamp chimney;

Fig. 2 is an approximately central vertical longitudinal sectional view through the improvement; and Fig. 3 is a bottom plan view of the same.

While my improved milk or water heater is primarily adapted to receive heat units from the flame of the lamp, as disclosed in Fig. 1 of the drawings, it is to be understood that the heater may be arranged directly upon a stove or other heating apparatus.

In the drawings the numeral 1 designates the upper portion of a lamp chimney which is adapted, of course, to be attached to an ordinary lamp, and when the latter is lighted the improvement, which is broadly indicated by the numeral 2, is arranged upon the chimney. The improvement contemplates the employment of a receptacle which, in the showing of the drawings, is in the nature of a cylindrical vessel, having an open top and a closed bottom, preferably provided, upon one of its sides with a handle 4. The closed bottom 5 of the receptacle 3 is centrally provided with an opening which is surrounded and closed by the lower and open end of a cylindrical dome 6. The dome, of course, has its upper end closed and terminates a suitable distance from the mouth of the receptacle. On the bottom 5 are arranged equally spaced concentrically arranged depending leg members 7. The legs are preferably three in number, as disclosed by the drawings, and comprise flat strips preferably of the metal of which the receptacle is formed. The legs have their lower edges provided with substantially V-shaped notches 8, and these notches are designed to be received upon the upper edge of the lamp chimney 1, as disclosed in Fig. 1 of the drawings. The legs elevate the receptacle when the device is employed upon a heating apparatus other than a lamp, so that a free circulation of the heat units may pass around the bottom of the device and enter the dome 6 thereof. The legs 7 are so arranged that the major portion of the heat units from a lamp, when the device is so used, are directed into the dome 6, and as a consequence the fluid in the receptacle is easily and quickly heated.

Having thus described the invention, what is claimed as new is:—

1. A heating device designed to be supported on the chimney of a lamp, comprising a receptacle having a dome arranged centrally therein and communicating with the bottom thereof, and concentrically arranged depending legs on the bottom of the said receptacle, disposed outward of the dome and designed to engage with the upper edge of the lamp chimney to support the same thereon and to sustain the same thereabove.

2. A heating device designed to be supported upon the chimney of a lamp comprising a receptacle having a central opening in the bottom thereof, a dome disposed centrally in the receptacle and having its lower open end arranged in the opening and secured to the bottom and closing the said opening, said receptacle, upon the bottom thereof having equally spaced depending legs arranged concentric of the dome, and the lower edge of each of said legs being notched, whereby the notched portions of the legs may be received over the upper edge of the chimney and the receptacle supported thereon and sustained thereabove.

In testimony whereof I affix my signature.

LEE H. WHITEHORN.